United States Patent
Gallagher et al.

(10) Patent No.: US 7,011,180 B2
(45) Date of Patent: Mar. 14, 2006

(54) SYSTEM FOR FILTERING ULTRASONIC NOISE WITHIN A FLUID FLOW SYSTEM

(75) Inventors: James E. Gallagher, Kingwood, TX (US); Michael P. Saunders, Kingwood, TX (US)

(73) Assignee: Savant Measurement Corporation, Kingwood, TX (US)

( * ) Notice: Subject to any disclaimer, the term of this patent is extended or adjusted under 35 U.S.C. 154(b) by 371 days.

(21) Appl. No.: 10/410,429

(22) Filed: Apr. 9, 2003

(65) Prior Publication Data

US 2004/0055816 A1 Mar. 25, 2004

Related U.S. Application Data

(60) Provisional application No. 60/411,572, filed on Sep. 18, 2002.

(51) Int. Cl.
*F01N 7/02* (2006.01)
*F01N 1/10* (2006.01)
*F01N 1/12* (2006.01)

(52) U.S. Cl. ............ 181/232; 181/252; 181/256; 181/279; 181/280

(58) Field of Classification Search ........... 181/232, 181/252, 251, 256, 257, 258, 268, 275, 279, 181/280, 233
See application file for complete search history.

(56) References Cited

U.S. PATENT DOCUMENTS

| | | | |
|---|---|---|---|
| 4,104,915 A | | 8/1978 | Husse |
| 4,141,334 A | | 2/1979 | Hatz et al. |
| 4,204,586 A | | 5/1980 | Hani et al. |
| 4,236,597 A | * | 12/1980 | Kiss et al. .............. 181/224 |
| 4,317,502 A | * | 3/1982 | Harris et al. ........... 181/280 |
| 4,371,054 A | | 2/1983 | Wirt |
| 4,468,971 A | | 9/1984 | Herzl et al. |
| 4,485,890 A | * | 12/1984 | Harris et al. ........... 181/280 |

(Continued)

FOREIGN PATENT DOCUMENTS

JP 59046817 A * 3/1984

(Continued)

OTHER PUBLICATIONS

John W. Stuart, Pacific Gas and Electric Company, San Francisco, CA; *Attenuation of Ultrasonic Noise in 2" ABS Pipe Fittings;* Presentation @ American Gas Association Conference, Dallas, TX, Apr. 2001.

(Continued)

*Primary Examiner*—Edgardo San Martin
(74) *Attorney, Agent, or Firm*—Fulbright & Jaworski LLP

(57) ABSTRACT

A method is employed to attenuate ultrasonic noise propagating in a flow stream of a fluid flow system. In particular, the method attenuates the noise propagating between a noise source and a reference point in the flow stream (wherein the reference point and the noise source are positioned in the flow stream in direct acoustic line of sight relation). The method includes positioning an absorbent element in the flow stream between the noise source and the reference point. Then, the ultrasonic noise is directed past vicinity of the absorbent element such that indirect ultrasonic noise is absorbed by the absorbent element. Preferably, the method also includes deflecting the ultrasonic noise to convert direct noise to indirect noise prior to directing the ultrasonic noise past the vicinity of the absorbent material in the flow stream. Such a method may be employed to attenuate ultrasonic noise by up to about 20 dB to 45 dB.

22 Claims, 13 Drawing Sheets

U.S. PATENT DOCUMENTS

| | | | |
|---|---|---|---|
| 4,528,652 A | | 7/1985 | Horner et al. |
| 4,533,015 A | * | 8/1985 | Kojima ..................... 181/280 |
| 4,605,092 A | * | 8/1986 | Harris et al. ................ 181/280 |
| 4,729,722 A | | 3/1988 | Toth |
| 4,790,864 A | | 12/1988 | Kostun |
| 4,791,810 A | | 12/1988 | Old et al. |
| 5,495,872 A | * | 3/1996 | Gallagher et al. ............ 138/44 |
| 5,529,093 A | * | 6/1996 | Gallagher et al. ............ 138/44 |
| 5,606,297 A | * | 2/1997 | Phillips ..................... 333/141 |
| 5,827,430 A | * | 10/1998 | Perry et al. ............ 210/497.01 |
| 6,089,348 A | * | 7/2000 | Bokor ....................... 181/272 |
| 6,338,277 B1 | * | 1/2002 | Diston et al. ............ 73/861.28 |
| 6,382,033 B1 | * | 5/2002 | van Bckkum et al. ... 73/861.28 |
| 6,494,105 B1 | * | 12/2002 | Gallagher ................ 73/861.27 |
| 6,533,065 B1 | * | 3/2003 | Zanker ..................... 181/264 |
| 6,851,322 B1 | * | 2/2005 | Gallagher ............... 73/861.27 |

FOREIGN PATENT DOCUMENTS

| | | | |
|---|---|---|---|
| JP | 03114099 A | * | 5/1991 |
| WO | WO 9420821 A1 | * | 9/1994 |
| WO | WO 9922207 A1 | * | 5/1999 |

OTHER PUBLICATIONS

Marcel J.M. Vermeulen, Instromet Ultrasonics BV, Dordrecht, The Netherlands, Geeuwke De Boer, Instromet Ultrasonics BV, Dordrecht, The Netherlands, Jim Bowen, Instromet Inc., Hosuton; *A model for estimation of the ultrasonic acoustic noise level emitted by pressure regulating valves and its influence on ultrasonic flowmeters;* Presentation @ American Gas Association Conference, Dallas, TX, Apr. 2001.

* cited by examiner

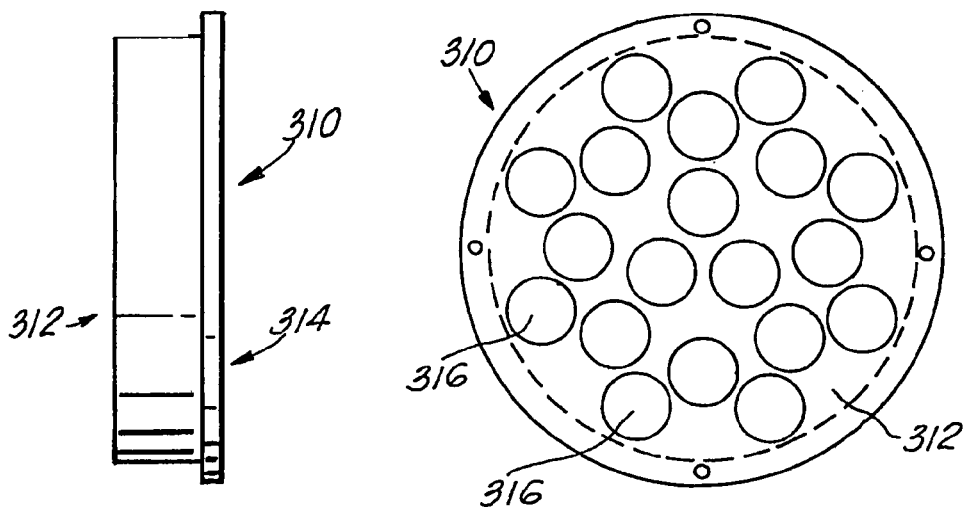
*FIG. 3A*  *FIG. 3B*
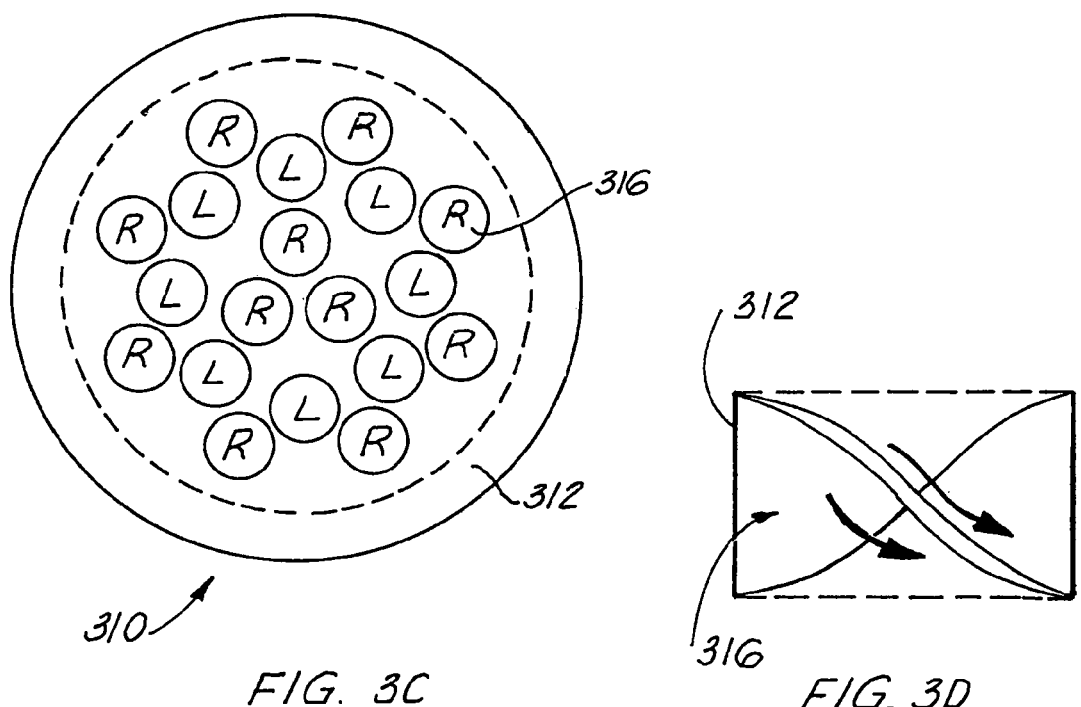
*FIG. 3C*  *FIG. 3D*

SYSTEM FOR FILTERING ULTRASONIC NOISE WITHIN A FLUID FLOW SYSTEM

The present invention claims the benefit of the filing date of U.S. Provisional Application Ser. No. 60/411,572 filed Sep. 18, 2002 (now pending). The above Provisional Application is hereby incorporated by reference for all purposes and made a part of the present disclosure.

BACKGROUND OF THE INVENTION

The present invention relates generally to a system, apparatus and method for filtering acoustic noise within a fluid flow system. More particularly, the invention relates to the mitigation or attenuation of ultrasonic noise, and the incorporation of such an apparatus within a fluid flow system that includes a noise source and an ultrasonic device. Further, the invention relates to the elements or components of such an apparatus, particularly directed to attenuating direct and/or indirect noise within a fluid flow environment.

Sound or noise is a longitudinal mechanical wave motion in an elastic medium and is classified according to its frequency—infrasonic, audible, and ultrasonic. The infrasonic classification refers to frequencies below the detection level of the human ear (less than 20 Hz). The audible classification refers to frequency that can be detected by the human ear (from 20–20,000 Hz). The ultrasonic classification refers to frequencies above the detection level of the human ear (above 20,000 Hz). Sensory effects of sounds denoted by a physiologist as loudness, pitch, and quality are correlated with the measurable parameters of sound denoted by physicists as intensity, frequency and wave shape.

The intensity of a sound wave is the amount of wave energy transmitted per unit time per unit area normal to the direction of sound propagation. That is, the intensity of sound is the power transmitted per unit area. In the audible classification of noise, the significant intensities for a human species are:

| Noise | Intensity (W/$M_2$) | Level (dB) |
| --- | --- | --- |
| Hearing Threshold | 1 E-12 | 0 |
| Whisper | 1 E-10 | 20 |
| Conversation | 1 E-06 | 65 |
| Street Traffic | I E-05 | 75 |
| Train in a Tunnel | 1 E-02 | 100 |
| Pain Threshold | 1 E-00 | 120 |

Acoustics is a systematic investigation of the nature, origin, and propagation of sound. Acoustic noise generation in a closed conduit can occur from many sources, including protruding gaskets, misaligned pipe flanges, headers, line size changes, valves, etc. The flowing velocity in the pipe is a major factor in the character of the acoustic noise. When pipe velocity is below 50 fps, one would expect noise from only a control valve, which is designed to manipulate the flow. When the pipe velocity is greater than 50 fps, noise generation can be initiated by a multitude of the aforementioned sources.

Sound waves are pressure pulses propagate in accordance with acoustic plane wave theory. Sound propagates as a pressure wave in gas flow system, i.e., pipe system or other fluid conduit, at the velocity of sound of the fluid. Such a propagating pressure wave will be reflected and absorbed at impedance discontinuities forming standing wave patterns or acoustic resonances. These resonances typically amplify pulsation by a factor of 10 to 100.

Noise travelling along the longitudinal direction, i.e., in parallel with the longitudinal centerline of the conduit, may be referred to as direct noise. Noise travelling in a direction that is not parallel to, or not oblique with respect to, the longitudinal centerline may be referred to as indirect noise. Direct noise may become indirect noise upon encountering a bend, obstruction, or certain discontinuities in the flow medium, that forces the pressure wave to reflect, refract or otherwise deviate from the direct or longitudinal direction. Indirect noise may, therefore, propagate through a extensive run of conduit by bouncing or reflecting off the walls of the conduit.

BRIEF SUMMARY OF THE INVENTION

In one aspect of the present invention, a fluid flow system is provided that includes a fluid flow conduit, a noise source disposed in the fluid flow conduit such that ultrasonic noise generated by the noise source propagates therein, and an ultrasonic noise filter apparatus also disposed in the fluid flow conduit. The ultrasonic noise filter apparatus includes a first and a second noise filter. The first noise filter has an absorbent element that is constructed to attenuate ultrasonic noise propagating from the noise source in the direction of the first and second noise filters. The second noise filter is advantageously disposed in the fluid flow conduit between the first noise filter and the noise source and includes a deflector element positioned to deflect ultrasonic noise propagating from the noise source before the ultrasonic noise passes to the first noise filter.

In this inventive fluid flow system, the deflector element is preferably acoustically positioned so as to provide the sole direct line of sight acoustic obstruction between the noise source and the first noise filter. In other words, the noise source and the first noise filter would be disposed in direct line of sight acoustic relation if not for the presence of the second noise filter. More preferably, the fluid flow system includes an ultrasonic device (e.g. an ultrasonic flow meter) that is operable at ultrasonic frequencies. The ultrasonic device is positioned in the fluid flow conduit such that the first and second noise filters are intermediate the ultrasonic device and the noise source. Further, the second noise filter preferably provides the sole direct line of sight obstruction between the ultrasonic device and the noise source.

In another aspect of the invention, a method is provided for attenuating ultrasonic acoustic noise in a fluid flow system between a noise source and a reference point. The reference point and the noise source are disposed in fluid communication such that absent any flow obstruction therebetween, the noise source and the reference point (e.g., an ultrasonic flow meter) would be positioned in direct line of sight acoustic relation and such that noise generated by the noise source propagates between the noise source and the reference point through a fluid flow path defined therethrough. The inventive method includes the steps of eliminating a direct acoustic line of sight between the noise source and the reference point and positioning an absorbent material in the flow path and in generally parallel relation therewith. During flow conditions, the absorbent material is utilized to absorb indirect noise propagating through the flow path and converting the absorbed indirect noise to vibration. Preferably, the step of eliminating the direct line of sight is performed acoustically upstream of the point where the step of absorbing is performed.

In another aspect of the invention, an ultrasonic acoustic noise filter is provided for incorporation into a fluid flow conduit and for attenuating ultrasonic noise propagating in the fluid flow conduit. This inventive noise filter includes a flow entrance, a flow exit, a plurality of channels extending between the flow entrance and the flow exit, and an absorbent element supported within one or more of the channels. Each of the channels defines a flow path between the entrance and the exit. Further, the absorbent element includes an absorbent material disposed in generally parallel relation with the flow path and configured to absorb indirect ultrasonic noise propagating in the flow path.

In yet another aspect of the invention, the ultrasonic noise filter includes a flow entrance and a flow exit that define a flow path therebetween and has a longitudinal centerline. The noise filter further includes an absorbent element disposed in the flow path. This absorbent element has lateral sections of absorbent material which are configured to absorb indirect noise propagating in the flow path. The lateral sections are disposed generally parallel with the flow path and are formed by spirally wound layers of the absorbent material. The absorbent material is preferably a fibrous, polyester material.

In yet another aspect of the invention, a method is employed to attenuate ultrasonic noise propagating in a flow stream of a fluid flow system. In particular, the method attenuates the noise propagating between a noise source and a reference point in the flow stream (wherein the reference point and the noise source are positioned in the flow stream in direct acoustic line of sight relation). The method includes positioning an absorbent element in the flow stream between the noise source and the reference point. Then, the ultrasonic noise is directed past vicinity of the absorbent element such that indirect ultrasonic noise is absorbed by the absorbent element. Preferably, the method also includes deflecting the ultrasonic noise to convert direct noise to indirect noise prior to directing the ultrasonic noise past the vicinity of the absorbent material in the flow stream. In the above manner, a method according to the invention may be employed to attenuate ultrasonic noise by up to about 20 dB to 45 dB.

In yet another aspect of the invention, a fluid flow system is provided including an ultrasonic device, a noise source and an ultrasonic acoustic noise filter. The ultrasonic device is a device such as an ultrasonic flow meter that is operational at ultrasonic frequencies. The noise source, which may be any one of a number of ultrasonic noise generators including control valves and flow regulators, is disposed in the fluid flow conduit and in fluid communication with the ultrasonic device and the noise filter. The ultrasonic acoustic noise filter is also disposed in the fluid flow conduit, between the ultrasonic device and the noise source, and in fluid communication with both components so as to define a fluid flow stream therebetween. Further, the noise filter includes an absorbent element for attenuating ultrasonic noise propagating from the noise source in the direction of the ultrasonic device.

In a preferred embodiment, the absorbent element is positioned in general parallel relation with the flow stream. Thus, the absorbent element is particularly adapted to absorbing indirect ultrasonic noise and/or converting noise energy into kinetic energy (i.e., vibrations within an absorbent material of the absorbent element). A preferred absorbent element has or consists of an absorbent material constructed of multiple spirally-wound, overlapping layers of fibrous material (e.g., polyester, polypropylene, or combinations thereof), thereby creating protrusions into the flow stream (for effecting turbulence). The fibrous network or components of the absorbent material are also particularly adapted to absorbing noise energy and effecting vibrations as a result thereof.

Thus, in one method of attenuating ultrasonic noise in a fluid flow system according to the invention, absorbent material is positioned in the flow stream between the noise source (e.g., a control valve) and a reference point (for purposes of evaluating the degree of attenuation) (e.g., an ultrasonic flow meter). Preferably, the absorbent material is positioned in generally parallel relation with the flow stream and thus, generally obliquely with the propagation direction of indirect noise. The ultrasonic noise is then directed past the vicinity of the absorbent material, such that at least some of the indirect noise energy in the ultrasonic noise is absorbed by conversion into kinetic energy (e.g., vibration within the absorbent material).

In yet another aspect of the inventive method, ultrasonic noise propagating from the noise source is first manipulated, e.g., deflected, to transform some of the direct noise into indirect noise, prior to encountering the absorbent material. For example, the ultrasonic noise may be directed through a flow-through device to eliminate a direct acoustic line of sight relation between the noise source and a reference point downstream of the noise source. The ultrasonic noise is then directed downstream in the vicinity of the absorbent material, such that indirect noise is absorbed by the absorbent material. In this manner, the inventive method may be employed to eliminate between about 20 dB to about 50 dB of ultrasonic acoustic noise.

BRIEF DESCRIPTION OF THE DRAWINGS

FIGS. 3 and 3A–3D are various views of en exemplary ultrasonic noise filter for deflecting and thereby attenuating ultrasonic noise, and particularly suited for use with a system, apparatus, and/or method according to the present invention;

DETAILED DESCRIPTION OF THE INVENTION

Figure 1:
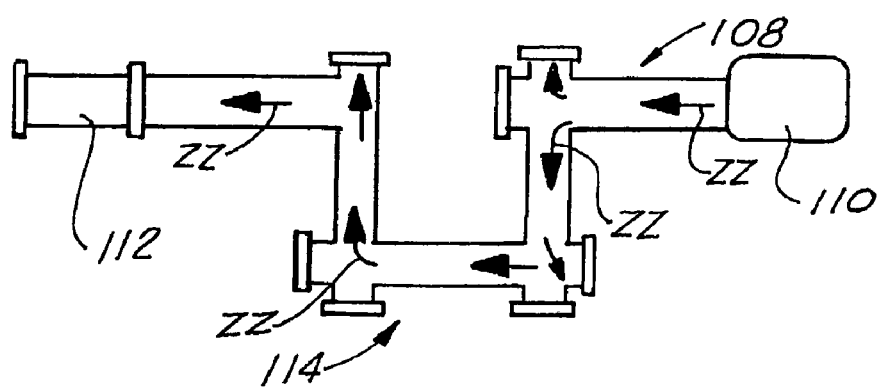
FIG. 1 is a schematic of a prior art fluid flow system.

For purposes of illustration, the following description focuses on an application wherein an acoustic filter according to the invention is incorporated in the fluid flow system including an ultrasonic device such as a multi-path ultrasonic meter, and a noise source, such as a control valve. Again, for purposes of illustration, the following description focuses on the problems and disadvantages presented by prior art systems including such an ultrasonic device and noise source, and preferred embodiments of the inventive system, apparatus and method particularly suited to address these problems and disadvantages. FIG. 1 depicts such a prior art fluid flow system 108 and is briefly described below.

FIGS. 2–7 depict ultrasonic noise filters and fluid flow systems incorporating such filters, or illustrate a method or performance associated with those noise filters, each of which embody various aspects of the invention. Upon review of the Detailed Description and the accompanying drawings provided herein, it will become apparent to one of ordinary skill in the art, however, that the present invention is also applicable to the other applications and to addressing other fluid flow and noise problems. For example, it will be apparent that the ultrasonic acoustic filter described herein may be installed in other fluid flow systems, whether gas or liquid flow, and in combination with other fluid flow elements. It will also become apparent that various elements of the ultrasonic acoustic filter provided herein (e.g., the construction of an ultrasonic noise absorbent element) may be incorporated with other acoustic noise managing devices and methods, not necessarily including all of the preferred components described herein. Moreover, it will become apparent that the invention encompasses variations of the preferred acoustic filters and preferred fluid flow systems described herein, as well as various methodologies utilizing some of these components.

The U.S. Occupational Safety and Health Act of 1970 (OSHA) established maximum permissible noise levels for all industries whose business affects interstate commerce. These permissible levels apply, of course, to industries concerned with fluid flow systems. In one method of addressing audible noise levels, certain processes and operators often convert the noise to the ultrasonic range, thereby generating yet a secondary source of ultrasonic noise.

As suggested above, control valve noise becomes a particular concern at higher pipe velocities. Control valve noise is a particular problem encountered with the installation and operation of ultrasonic meters (and other ultrasonic devices). In particular, control valve noise is a problem that has to be addressed when installing multi-path ultrasonic meters for natural gas applications. Other particularly problematic noise sources in these flow environments are flow regulators and piping induced disturbances.

Referring to the schematic of FIG. 1, in a typical ultrasonic meter application, a control valve 110 or other noise source will be placed upstream or downstream of an ultrasonic meter 112. Current practices dictate that the control valve 110 should be placed downstream of the meter 112 to ensure that the acoustic noise generated by the valve 110 does not "scramble" the acoustic signal of the ultrasonic meter. Various techniques are commonly employed to minimize the impact of the ultrasonic noise generated by the control valve 110 (none of which includes the use of an ultrasonic acoustic filter). In the particular case of multi-path ultrasonic metering station, it is a typical recommendation that either the control valve or regulator be located downstream of the meter 112. The noise generated from typical control valves normally covers a wide frequency range, part of which will include the operating range of the ultrasonic meter itself, e.g., 100–200 KHz. It is a particular challenge when the meter is operating and encounters noise levels in excess of its normal operating range. In a typical frequency response curve for a control valve, a peak frequency emitted will be approximately 60 kHz. However, it is important to illustrate that even at the higher frequencies, 100–200 KHz, it can be seen that the noise level may be in excess of 130 dB. The ultrasonic meter may operate effectively up to a noise level of 90 dB, however, above that level, the noise may be too extreme for the meter to overcome (e.g., using its traditional signal processing and gain control regimes). At this point, it becomes clear that the meter will start losing pulses during the transmission and reception cycle and become inoperable or marginally functional depending upon the noise levels being experienced.

The level of noise generated is dependent on: flow rate; pressure drop across the valve or restriction; and the type of valve or restriction. In one aspect of the invention, an ultrasonic acoustic filter is provided which accommodates the extreme noise reduction scenario of high velocity with high pressure drop, through an ultrasonically noisy restriction (such as a valve or pipe restriction).

Currently, manufacturers and operators employ different noise mitigation techniques in the meter itself ranging from increasing the amplitude of the pulse transmitted sometimes coupled with complex digital signal processing techniques. However, while the amplitude of the noise remains above that which the meter can effectively operate, it will be difficult to establish a working environment for such a meter. Thus, most manufacturers now consult with the operator to ensure that the meter has a better chance at successful operation by establishing installation criteria. For example, the manufacturer may recommend deployment of higher frequency transducers. The operation of higher frequency transducers does not guarantee, however, elimination of the noise problem entirely. From the frequency response curve, it can be seen that the noise levels at the higher frequencies, while being less than the lower frequencies, are not significantly reduced.

Secondly, the manufacturer may recommend the installation of multiple blind tees, elbows, or crosses between the source of the noise and the meter. The installation of FIG. 1, which includes blind tees (or crosses) 114, adopts this recommendation. With regard to the use of multiple "blind" or dead ended tees and elbows, this creates a number of challenges for the piping designer. For example, this adds to the complexity, extent, and efficiency of the piping system. Moreover, such a number of obstruction in the piping system presents potential erosion challenges, especially at the higher velocities. Such a complex piping configuration also provides an increased number of potential leakage sites and potential maintenance problems. In any event, the blind tee arrangement 114 of FIG. 1 may be expected to attenuate ultrasonic noise generated by the control valve by up to 8 dB.

In one aspect of the invention, a system and apparatus is provided for filtering ultrasonic noise in a fluid flow system, utilizing a minimum number of piping disturbances and a simpler configuration. In yet another aspect of the invention, a system for filtering ultrasonic noise is provided wherein the noise source, noise filtering apparatus or system, and ultrasonic device are provided along a relatively straight piping run, wherein the ultrasonic device and the noise source would otherwise be acoustically positioned along a direct line of sight (or simply, line of sight (LOS)). When there is a direct acoustic line of sight relation between the noise source and the ultrasonic device, ultrasonic noise generated by the noise source could otherwise propagate in a generally direct fashion to the ultrasonic device without reflection or obstruction.

Figure 2:
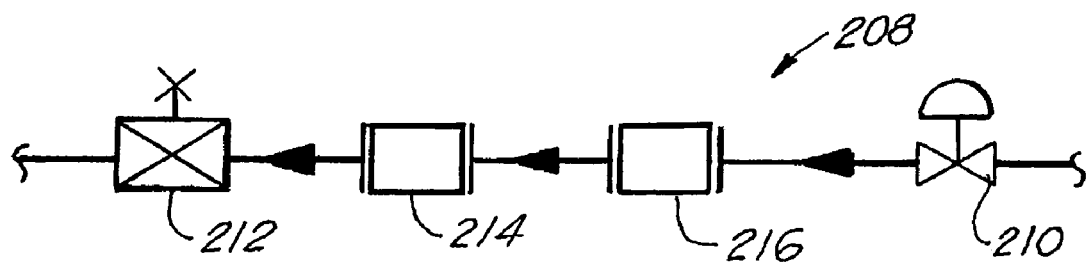
FIG. 2 is a schematic of a fluid flow system according to the present invention.

Referring to FIG. 2, a preferred fluid flow system 208 according to the invention includes an noise source such as a control valve 210, an ultrasonic device such a flowmeter 212, a first noise filtering device or noise filter 214, and, optionally, a second noise filtering device or noise filter 216.

The first and second filtering devices 214,216 may be regarded also as one noise filtering apparatus or system.

As shown in the Figure, the control valve 210 and the meter 212 are disposed in fluid communication in a substantially straight piping run and are acoustically positioned such that, absent any obstructions in the flow stream, would (otherwise) be in direct line of sight relation. In such a system 208, the ultrasonic noise generated by control valve 210 has a substantial direct noise component or focus. Thus, in one aspect of the present inventive method, the ultrasonic noise propagating therefrom is first deflected by a deflector element such as second noise filter 216. In this manner, the line of sight relation between the control valve 210 and the meter 212 is eliminated. This also means that much of the direct noise generated by the control valve 210 is transformed into indirect noise by way of deflection (or by traveling through turbulent flow regions).

Although, attenuation of the ultrasonic noise does occur through use of the second noise filter 216, the preferred method employs a second phase or operation to further attenuate the ultrasonic noise. Located downstream of the second noise filter 216, the first noise filter 214 receives much of the indirect noise exiting the second noise filter 216, which at this stage may be propagating off the walls of the pipe conduit, at a rate depending partially on the pipe configuration and spacing between the filters 214, 216. In any event, according to the preferred method, the first noise filter 214 operates to absorb much of the indirect noise received therein, e.g., by converting ultrasonic noise energy to vibration within or of an absorbent material, thereby furthering attenuating the ultrasonic noise to a significant degree.

In the manner described above, attenuation of the ultrasonic noise can be attained at levels up to about 40 to 50 dB. It should be noted, however, that some of the attenuation can be attributed to other modes other than the deflecting and absorbing operations described. As will become apparent with the more detailed descriptions of the systems and apparatus provided below, the noise filters 214,216 (and other components in the fluid flow system) also have the capacity to reflect, deflect, absorb, or otherwise attenuate ultrasonic noise in other ways.

The illustrations of FIGS. 3 and 3a–3c depict an exemplary ultrasonic acoustic noise filter 310 for use with the inventive system and method. In particular, the acoustic noise filter 310 is designed to convert systematic motion of the fluid into uncoordinated random motions. Specifically, as the fluid passes through the acoustic noise filter 310, the noise filter 316 acts to isolate the piping system, by eliminating the line of sight relation between the noise source and the reference point, e.g., between the control valve and the meter. In this respect, the noise filter 310 is a suitable specific embodiment of the second noise filter 216 described above with respect to FIG. 2.

Figure 3:
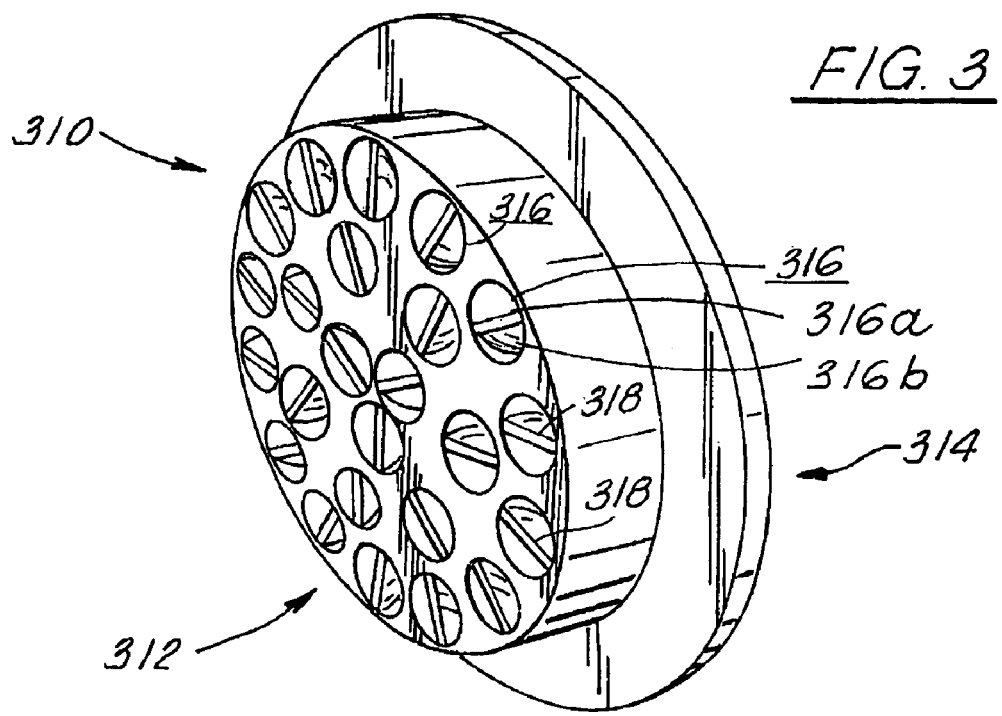

As shown in the perspective view of FIG. 3, the acoustic noise filter 310 includes a plurality of flow through ports 316 at an upstream or entrance face 312. The ports 316 are spaced about the face 312 in a coordinated predetermined manner and so as to provide a suitable porosity value for the filter 310. In one aspect of the invention, the ports 316 is split into a first flow channel 316a and a second flow channel 316b by way of a helix 318. Each of the flow channels 316a and 316b extend through the length of the acoustic noise filter 310 to provide a flow stream thereacross. The helix 318 is inserted in the port 316, however, to split and deviate the flow in a rotative manner. More importantly, the helix 318 provides an obstruction in the longitudinal direction of the port 316, thereby eliminating the direct acoustic line of sight relation between the entrance and the exit, and more broadly, between the noise source and the reference point, e.g., the control valve and meter. In this manner, attenuation of ultrasonic noise may be effected by approximately 8 dB.

FIG. 3c is plain view illustration of the entrance face 312 of the noise filter 310. In particular, FIG. 3c charts the flow orientation of each port 316 (and the flow channels 316a, 316b provided therein). As shown in the illustration, each of the pair of flow channels 316a, 316b is either rotated (by way of the helix 318) in a clockwise or right ("R") or in the counter-clockwise or left ("L") direction. Further, each of the ports 316 is positioned such that each right rotating pairs of flow channels 316a, 316b is adjacent a left rotating pair of flow channels 316a, 316b. In this way, at the downstream side of the noise filter 310c, individual flows exit in the clockwise or counter-clockwise direction. Further yet, each counter-clockwise individual flow stream is positioned adjacent an oppositely rotating or clockwise rotating flow stream. In this way, a field of turbulence is provided immediately downstream of the noise filter 310. It has been found that the provision of such a field of turbulence functions to further deflect (and attenuate) ultrasonic noise propagating through the flow stream.

Referring to FIG. 3d, the helix 318c can be made from most metallic or other rigid structure, preferably sealably welded within the port 316. In preferred embodiments, a 10" flow I.D. noise filter 316 may be configured so as to have a flow length of about 2–2½". In the case of such a 10" noise filter 310, the ports 316 preferably have a 1.5" diameter.

Figure 3E:
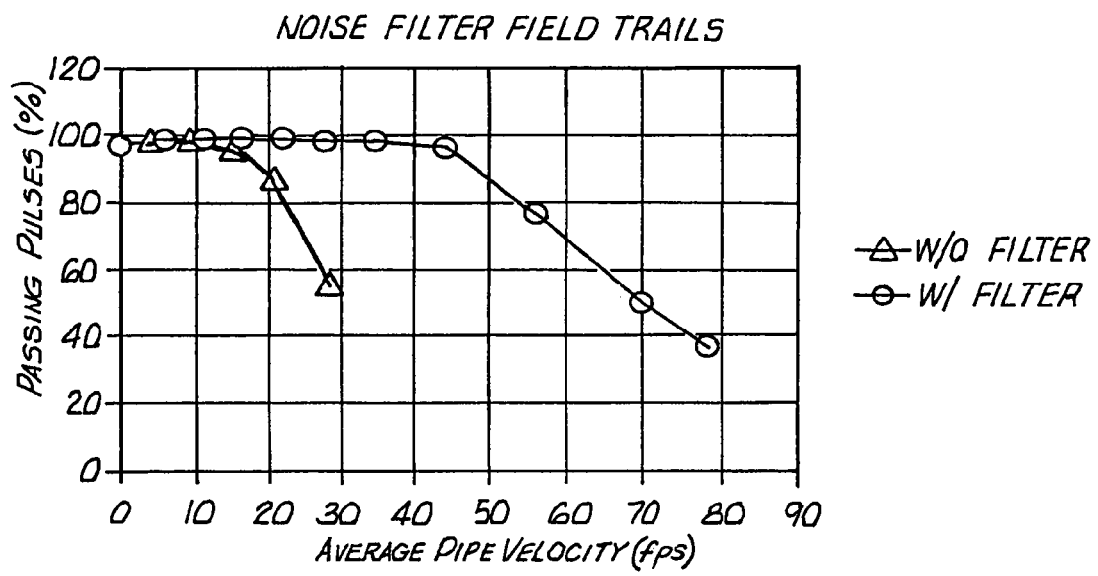
FIG. 3E are performance results of the noise filter shown in FIGS. 3 and 3A–3D.

FIG. 3e provides a summary of field tests or trials for an acoustic noise filter such as noise filter 310.

Figure 4:
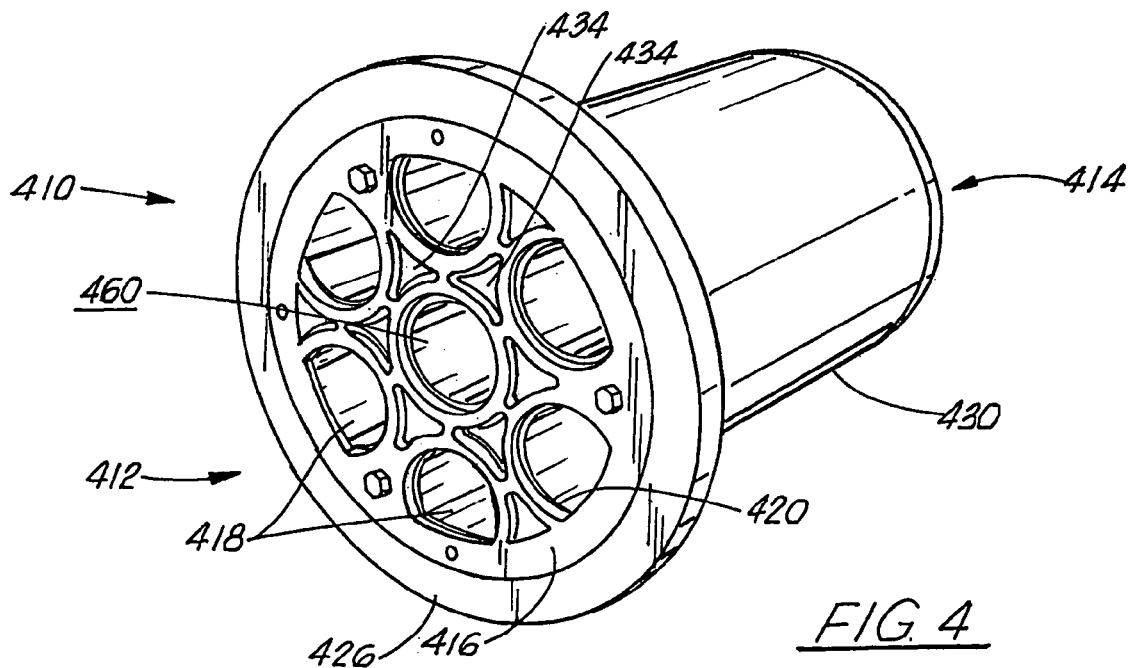
FIGS. 4 and 4A–4H are various views of another set of exemplary ultrasonic acoustic noise filters according to the invention.
Figure 4A:
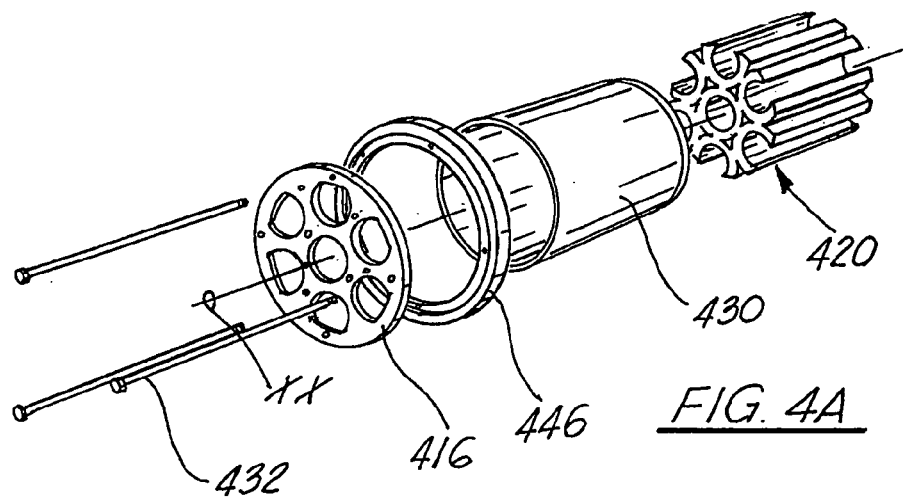

FIG. 4 illustrates an exemplary ultrasonic acoustic noise filter according to the invention. More specifically, the noise filter 410 depicted in these figures are particularly suited for absorbing indirect noise propagating therethrough, in the order of about 40 to 50 dB. As further described below, the noise filter 410 provides an absorbent element having absorbent material thereon which converts indirect noise propagation into vibration (and, also thereby converting the indirect noise energy into small amounts of thermal energy). In yet another aspect of the invention, the noise filter 410 may be incorporated into a fluid flow system wherein the noise source and a reference point, e.g., a control valve and an ultrasonic flow meter, are acoustically positioned in direct line of sight relation. Further, the noise filter 410 is particularly suited for incorporation into the flow system 208 of FIG. 2 as the first noise filter 214.

Now turning to the simplified illustrations in FIG. 4, an exemplary ultrasonic acoustic noise filter 410 is shown therein, particularly suited for absorbing indirect noise so as to attenuate the ultrasonic noise by or up to 40–50 dB (gross noise absorption). FIG. 4 and FIG. 4a–4h provide details for a noise filter 410 designed for installation in a 10" piping flow system. The noise filter 410 includes an upstream side 412, a downstream side 414, and a longitudinal structural center line XX. On the upstream side 412, the profile of the noise filter 410 is defined by a mounting ring 426 supporting a front webbing plate 416. The front webbing plate 416 provides a plurality of flow channels 418, each of which has a flow through, see through flow configuration. In this particular embodiment, the webbing plate 416 defines a group of six outside channels 418 surrounding a central or inside channel 460. Further yet, the configuration of outside channels 418 and inside channel 450 defines additional flow channels 434 positioned therebetween.

With reference also to FIGS. 4a–4h the noise filter 410 also includes a canister or housing 430 that mates with the webbing plates 416, and a downstream webbing plate 444. As best illustrated in the cut out of FIG. 4c, these components house or maintain a plurality or bundle of absorbent elements 420. As will be discussed further below, the absorbent element 420 is made up of longitudinally extending absorbent material which provides an absorbent surface for indirect noise. The absorbent element 420 is further maintained in place by way of thread rods 432 that extend between the webbing plate 416 and the downstream webbing plate 444. The thread rods 432 further support the components of the noise filter 410, but specifically compressibly supports the absorbent element and material 420. It has been shown that the addition of the thread rod 432 provides advantageous structural integrity to absorbent element 420. In particular, such structural support enhances the rigidity and the ability of the absorbent element 420 to vibrate in the desired manner.

As illustrated by the Figures, each of the flow channels 418, 460, and even flow channel 434, provides a substantially straight through, see through, individual flow path. Each of channel 422 is defined by an inside surface provided by the absorbent material 420, as well as an exposed surface (i.e., free of absorbent material 420). In relation to the individual flow paths through the channels 422, 434, 450, the absorbent material is positioned in parallel relation to the substantially straight through flow path and each of the individual channels 422, 450, and 434. In other words, absorbent material will be advantageously positioned obliquely with respect to the indirect noise, but in parallel with direct noise.

Figure 4B:
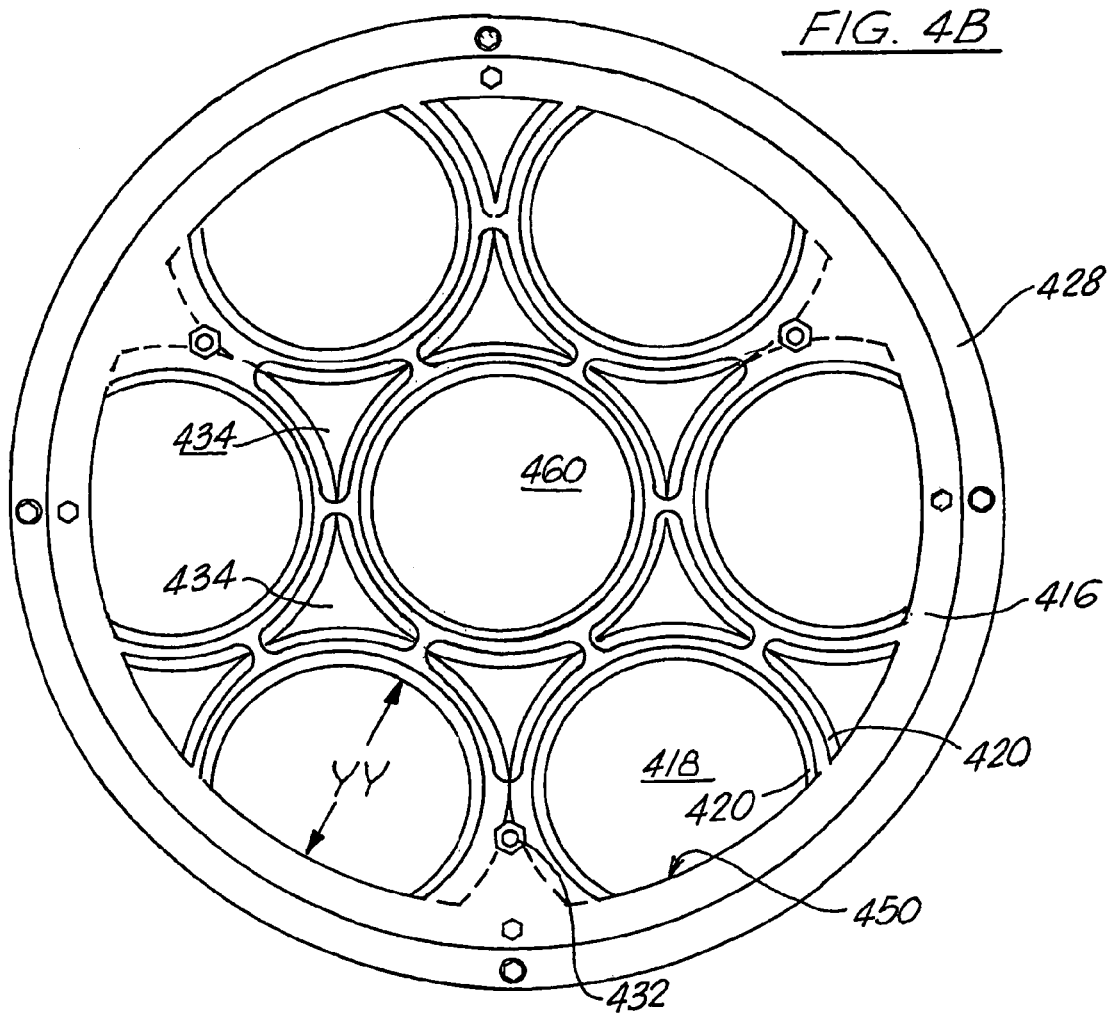
Figure 4C:
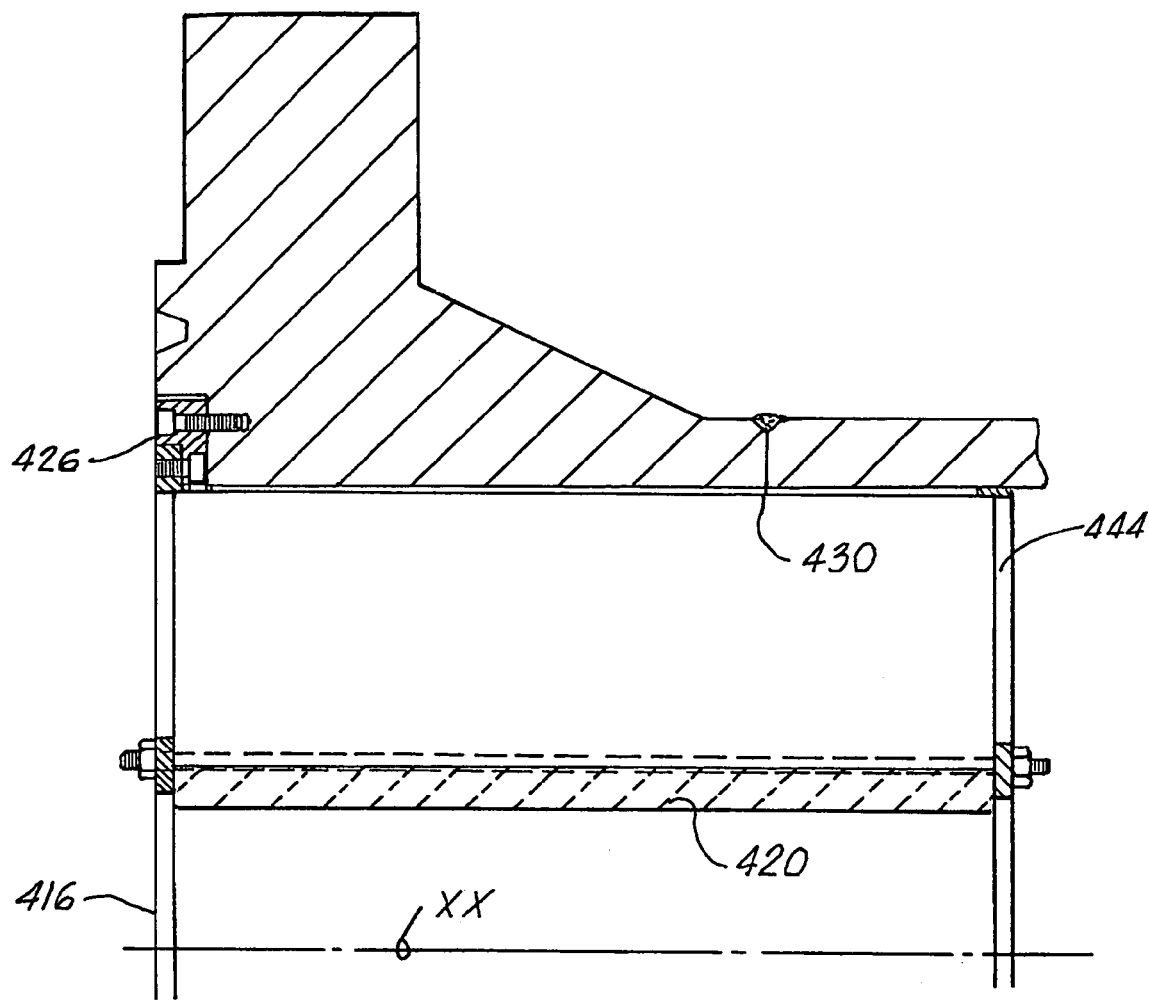
Figure 4D:
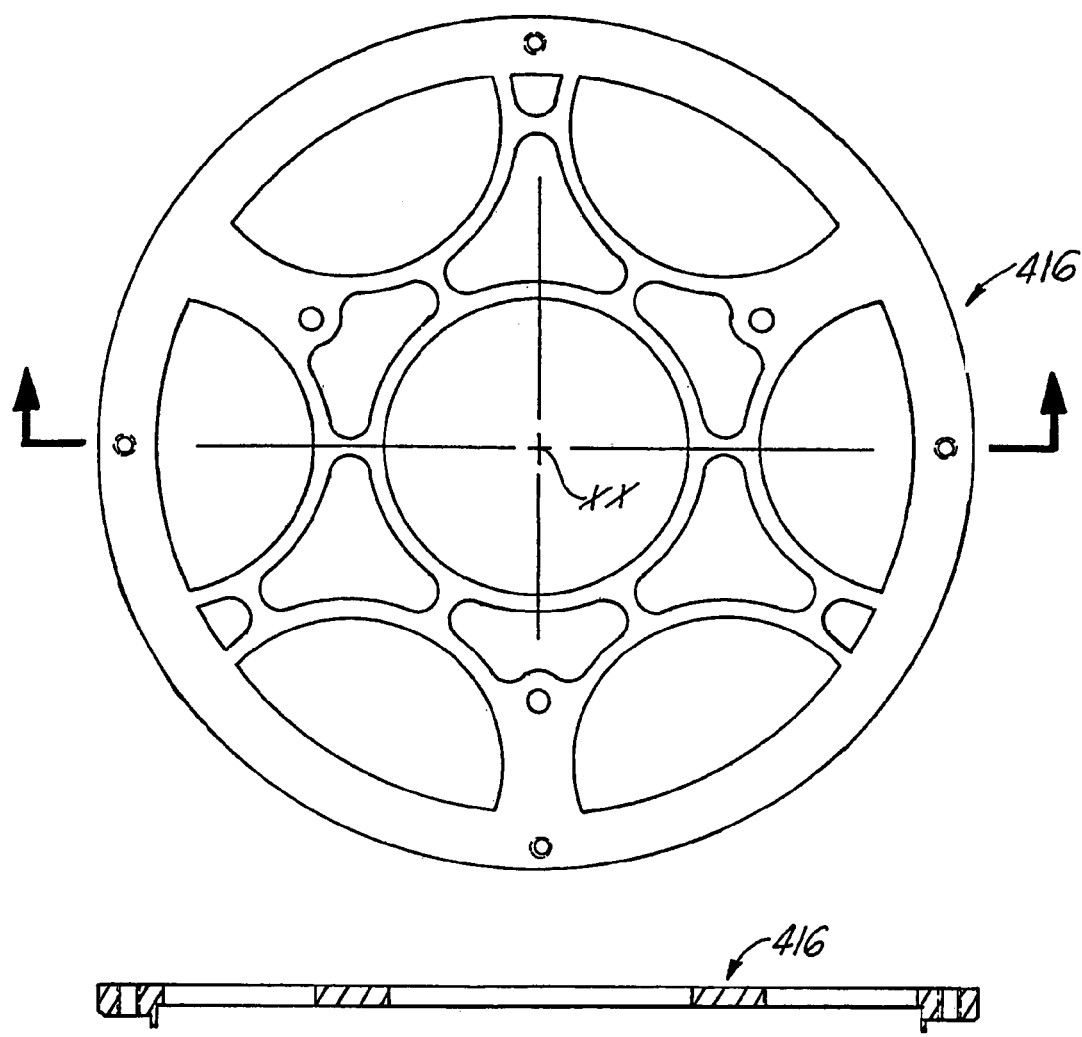
Figure 4F:
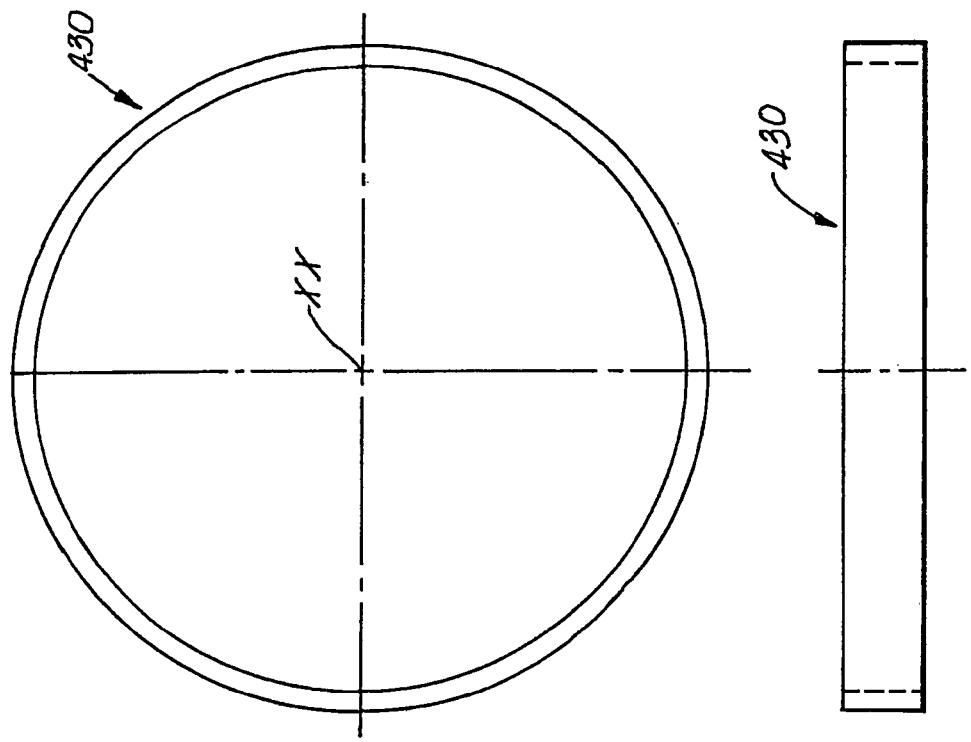
Figure 4E:
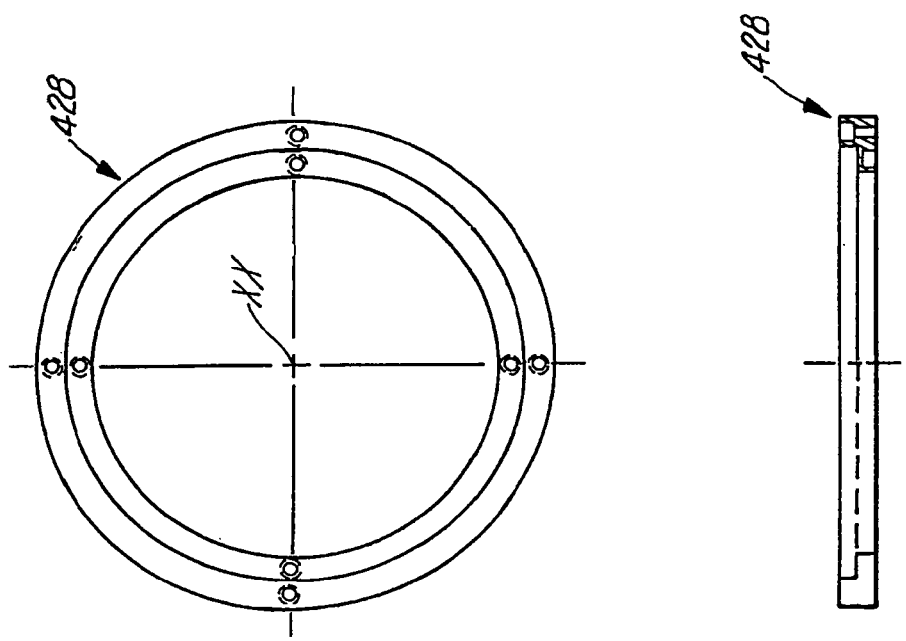
Figure 4G:
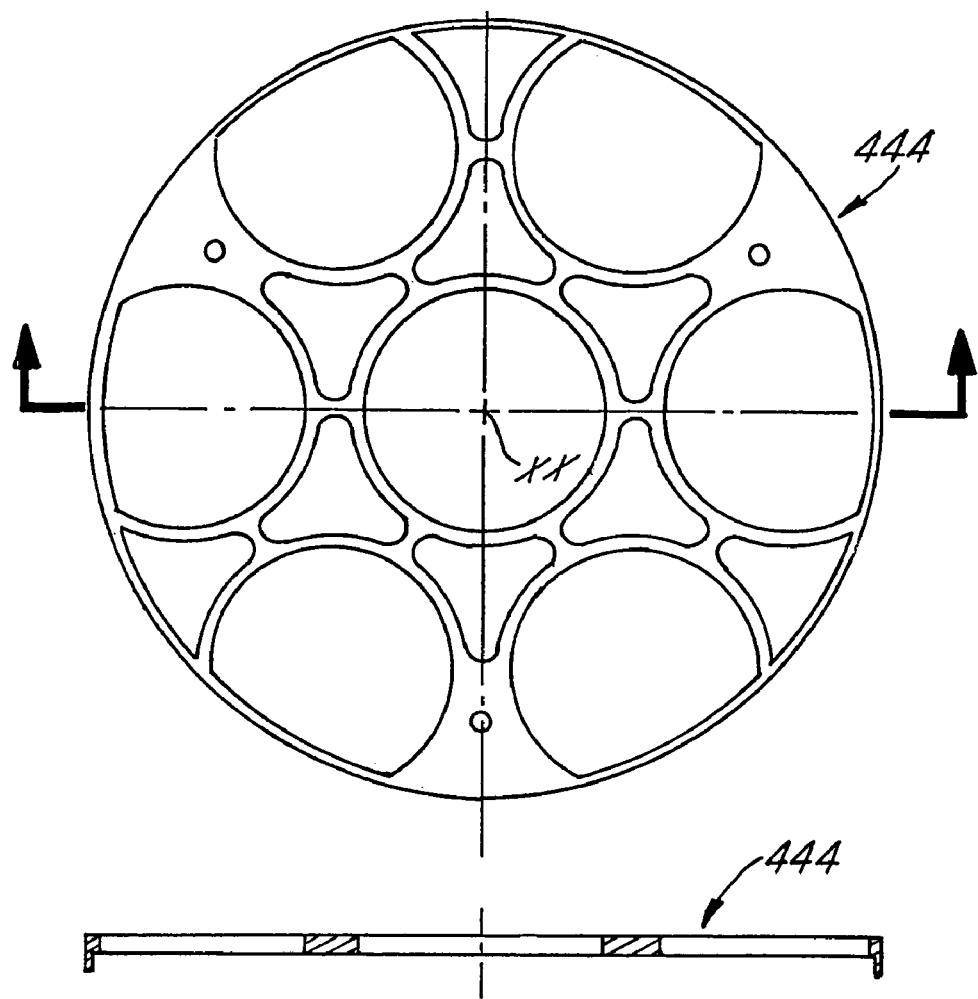
Figure 4H:
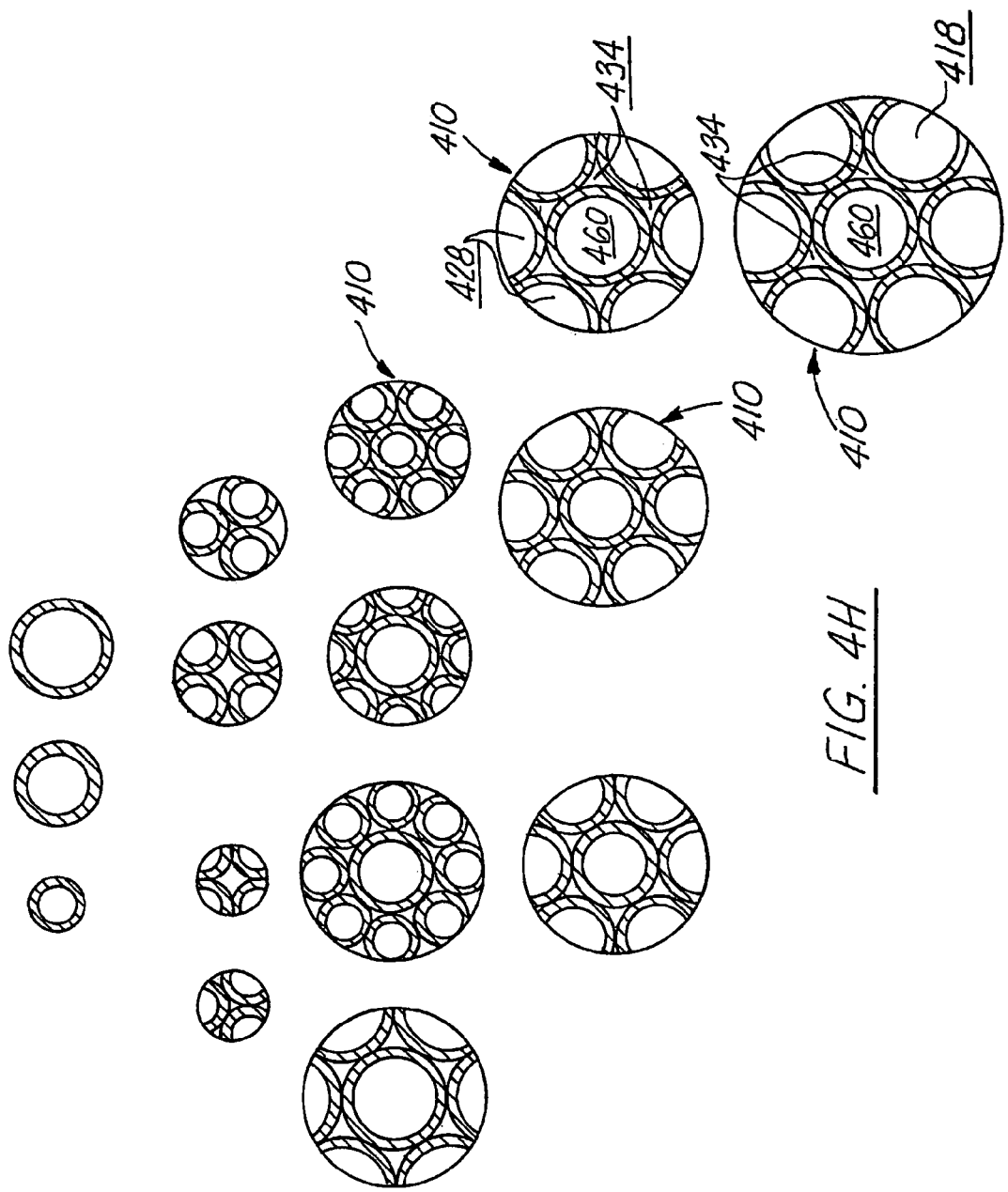

Referring specifically to FIG. 4b, each of the outside channels 422 may be defined by a maximum gap YY between the exposed surface 450 and the absorbent surface defined by the absorbent material 420. In the preferred design configurations, applicants have found that optimal designs may be partially dictated by maintaining the maximum gap YY constant between noise filters in the 4" to 12" pipe diameters. As the pipe diameter varies, the number of outside channels are required to vary also (as the inside circumference of noise filter 410 also varies). This variance is further accommodated by providing and varying the size of inside channel 420. This is best illustrated in FIG. 4, wherein various webbing plate configurations are denoted by the pipe diameter. For example, for a 4" configuration, 3 or 4 outside channels are used in combination with a single inside channel. For a 16" pipe configuration, 6 outside channels are used in combination with an inside channel as well as six intermediate channels.

Referring back to FIGS. 4a and 4b, it is evident that the intermediate channels 434 are a product of the orientation of the outside channels 418 and inside channel 460. That is, the inside surface of the intermediate channels 434 are the backsides of the absorbent element 420, which define the outside channels 418 and inside channel 460. Thus, in one aspect of the invention, a unique configuration of flow through channels and absorbed materials is provided so as to optimize the surface area of the absorbent material as well as maintaining structural integrity and efficient use of materials. Moreover, in an aspect of the invention, the optimization of the design of the noise filter 410 becomes a function of or is motivated in varying degrees by the total surface area of absorbent material, the size and number of the flow channels particularly the inside and outside channels (e.g., maintaining a maximum gap YY), porosity, the length of the flow channels, and the pipe size. These parameters are, of course, related, e.g., total absorbent surface is a function the flow channels sizes and configurations, and the length of the flow channel.

Porosity is also inter-related with these parameters, e.g., increasing or decreasing the flow channel sizes affects the porosity of the noise filter 410 (because porosity is the ratio of the unrestricted to restricted area to flow). It is common to maximize the unrestricted flow for flow purposes, however, this is weighed against the structural requirements of the device. For the various embodiments of the noise filter 410 as depicted in FIG. 4, the porosity is preferably about 40–70%, the porosity and more preferably in the range of about 44–64%

As alluded to above, optimization of the noise filter 410 design is significantly governed or motivated by parameters relating to the absorbent material 420. In addition to surface area, the thickness of the absorbent material 420 and the maximum gap YY is also of importance.

In any case, FIGS. 4 and 4a–4h are provided to show preferred configurations, dimensions, material selections, and other design considerations and parameters for a noise filter 410 according to the present invention. Details of the preferred and/or optimal designs (including dimensions and surface areas) may be derived from these "to scale" construction drawings. For this purpose, a set of drawings applicable to a 12" embodiment of the noise filter 410 is also provided.

The simplified diagrams of FIG. 5 illustrate in some detail the construction of the noise filter 410, particularly in and around the flow pattern. More importantly, diagrams illustrate the behavior of fluid flow and acoustic wave motion within and through the flow channel. In these drawings, reference ZZ is used to denote propagation of high frequency sound wave (i.e., ultrasonic noise). It is important to note the direction (i.e., direct and indirect; reflective, direct) as well as intensity of strength of the sound wave illustrated. Reference WW is used to denote fluid flow, which, in the exemplary case, is gas flow. Finally, reference VV is used to denote a fluid area or field of turbulence.

Figure 5A:
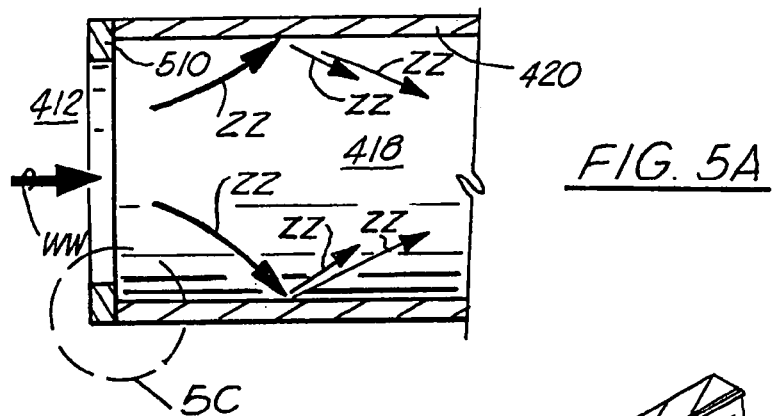
FIGS. 5A–5C are various simplified illustrations of a preferred flow channel within a noise filter according to the invention, and including an absorbent material or absorbent element according to the invention.
Figure 5B:
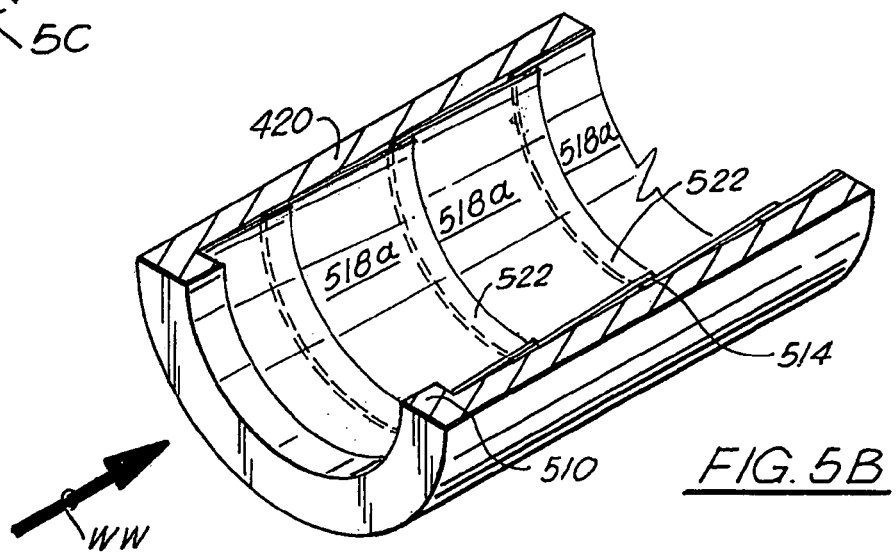
Figure 5C:
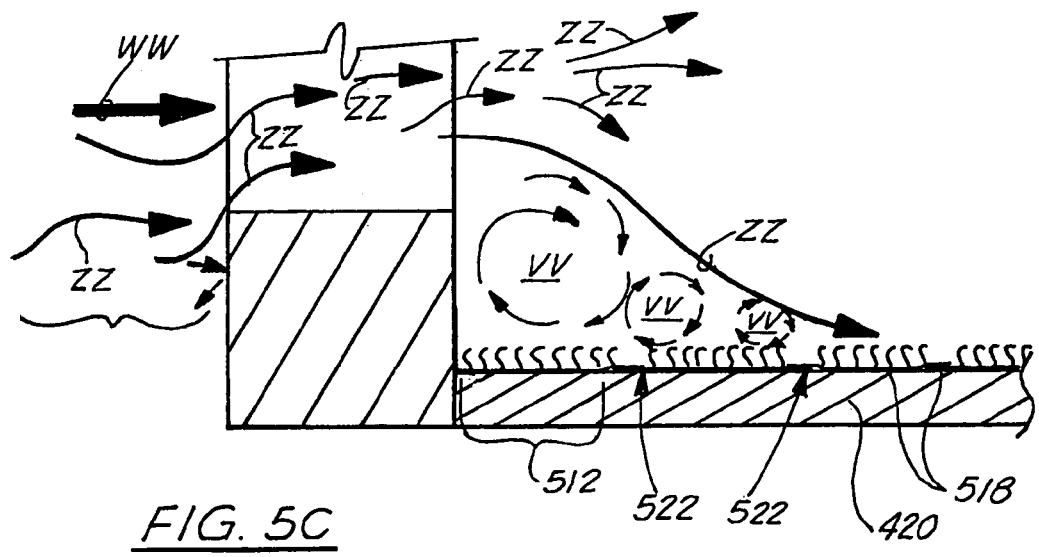

FIG. 5A provides a longitudinal cut-out of one of the flow channels 418, specifically the portion defined by the wall surface of the absorbent material 420 (as opposed to the exposed wall surface). FIG. 5B is a yet another cut-out from the FIG. 5A, but in perspective view. FIG. 5C is a detail cross-sectional of a portion of FIG. 5A to illustrate (in both simplified and exaggerated terms), certain fluid and acoustic dynamics as would occur in the operation of a method of attenuation according to the present invention.

In yet another aspect of the invention, the absorbent element 420 (or acoustic element) of the noise filter 410 is provided with or consists of an absorbent material 420 advantageously configured and positioned within the flow stream WW to absorb, and thereby, attenuate indirect noise. The absorbent material 420 selected is both capable of absorbing indirect noise and is mechanically sound. In particular, the absorbent material is adapted to converting ultrasonic noise energy into kinetic energy in the form of elicited vibrations in the absorbent material. Further, the selected material is able to withstand both water and hydrocarbon saturation.

In preferred embodiments of the invention, a hard, manmade, fibrous material is used as the absorbent material. Moreover, the material is provided in a cylindrical configuration, formed by a very large number of the material layers 518 (see e.g., FIG. 5B). The material layers 518 are preferably spirally or helically wound to form overlapping layers (e.g., 150 layers for 3" to 5.5" OD×12" long tube)). More preferably, the absorbent material 420 includes several laterals sections 518a of polyester and propylene media formed in a conical helix pattern. Each lateral section consists of multiple helically or spirally wrapped layers 518. Thermally bonded, the layers 518 are applied to conform and overlap previously-applied layers, thereby forming the conical helix structure.

One advantageous aspect of this configuration is the formation of protrusions or steps 522 at the transition points or areas between lateral sections. As discussed below, these steps 522 function to effect additional regions or fields of turbulence VV within the flow channel 420. As best shown in FIG. 5C, the absorbent material 420 provides a rough, uneven surface due to the steps 522 as well as the fibrous materials or fibers 512, a significant portion of which protrude into the flow stream WW. Applicants have discovered that such an absorbent surface disposed in the flow path and in parallel relation therewith, enhances the absorption of ultrasonic noise.

The fibrous material or fibers 512 presents a cellular construction or network that is particularly adapted to propagating and transferring vibration energy through the absorbent material. The fibers 512 function as vibrating elements suspended from the rest of the absorbent material 420 or base. The fibers 512 also contribute to the rough texture of the absorbent surface, hereby also effecting some degree of turbulence VV.

One preferred absorbent material particularly suited for the embodiments described herein is a coreless and spirally wound filter element as described in U.S. Pat. No. 5,827, 430, hereby incorporated by reference and made a part of this disclosure. The '430 patent also discusses a suitable construction of the absorbent material. It should be, noted, however, that the material taught in the '430 patent is designed and intended for a gas flow filtering operation (and not contemplated for noise management or absorption). For this and other reasons, the discovery of the advantageous application of such fibrous material in the present ultrasonic noise attenuating application was very unexpected and fortuitous.

As best shown in FIGS. 5B and 5C, the flow channel is also characterized by a lip pr dam structure 510 at the entrance face. The lip or dam 510 is created by providing an entrance radius that is less than the inside diameter or radius of the absorbent material 420. In other words, the maximum gap between the absorbent surface and an oppositely facing surface is greater than the same gap with respect to the dam 510. As shown in FIG. 5C, as fluid flow WW enters the flow channel 418, the dam 510 effects a turbulence region VV immediately downstream thereof. Additional turbulence fields VV are also effected downstream along the length of the flow channel 418, including radially inward of the steps 522 and of the fibers 518 Such turbulence contributes to the deflecting, bending, or otherwise conversion of more direct noise to randomly directed noise and thus indirect noise, which can be absorbed by the absorbent material 420. The turbulence field VV generated, therefore, enhances the capacity of the noise filter 410 to attenuate ultrasonic noise.

Thus, when indirect ultrasonic noise ZZ enters the flow channels 418 of the noise filter 418, much of the indirect noise component of the ultrasonic noise ZZ make contact with the absorbent material 420. Some of the ultrasonic noise encounter the surface areas of the webbing plate and of the dam, and are reflected therefrom. More enter the flow channel 418 and are further deviated from a direct path by turbulence fields VV. Much of the indirect noise ZZ hit the absorbent material 420, is partially absorbed, then deflect back into the flow channel 418. Such absorption and deflection pattern of the ultrasonic noise ZZ continues along the length of the flow channel 418. In any event, a significant portion of the ultrasonic noise is absorbed by the absorbent material, by converting the kinetic energy of the noise into kinetic energy or vibration of the fibrous network of the absorbent material 420.

In another aspect of the invention, the mechanical integrity of the absorbent materials or bundles of the absorbent material (see e.g. 420 in FIGS. 4b–4c) is maintained and enhanced by addition of compressible supports. In a preferred embodiment, as illustrated in FIG. 4, compressible supports are provided in the form of longitudinally extending tie rods 432. Additional support is provided by the mounting ring, webbing plates, and housing, but the total effect is a mechanically supported absorbent structure also having the desired rigidity and resiliency particularly suited to absorbing ultrasonic noise energy.

In a preferred deployment of acoustic filters according to the invention, and incorporation into a fluid flow system, the inventive acoustic noise filter as illustrated in FIG. 4, is provided in a fluid flow system including a noise source and a meter. For example, in a fluid flow system including an ultrasonic meter and a control valve, the acoustic noise filter 410 is provided in the fluid flow system and in fluid communication with the ultrasonic meter and control valve.

Figure 6A:
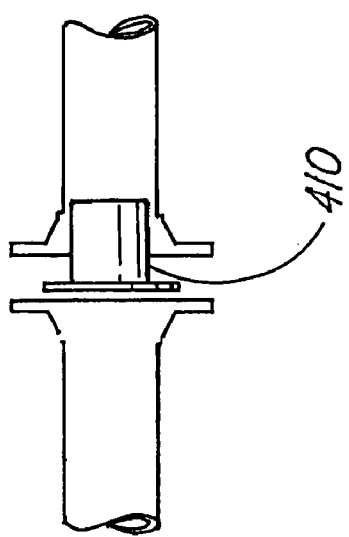
FIGS. 6A–6F are various simplified schematics of fluid flow systems in accordance with or embodying various aspects of the present invention.
Figure 6C:
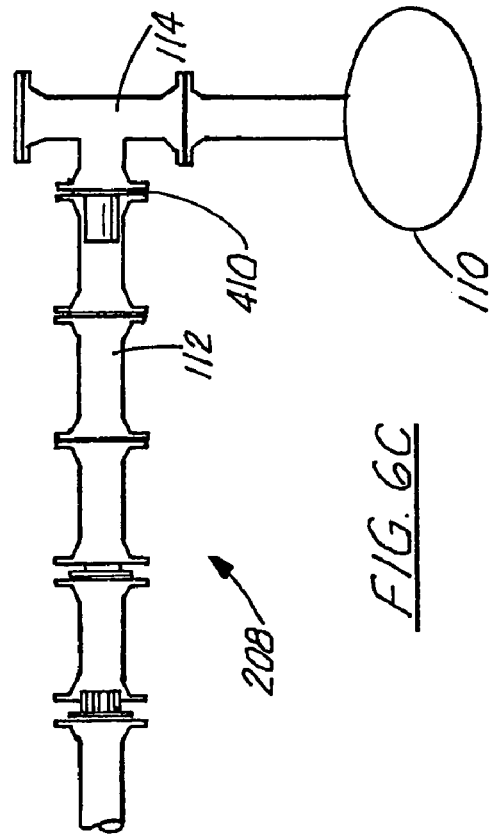
Figure 6B:
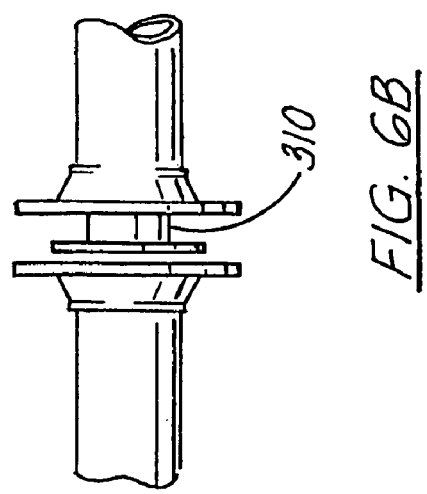
Figure 6D:
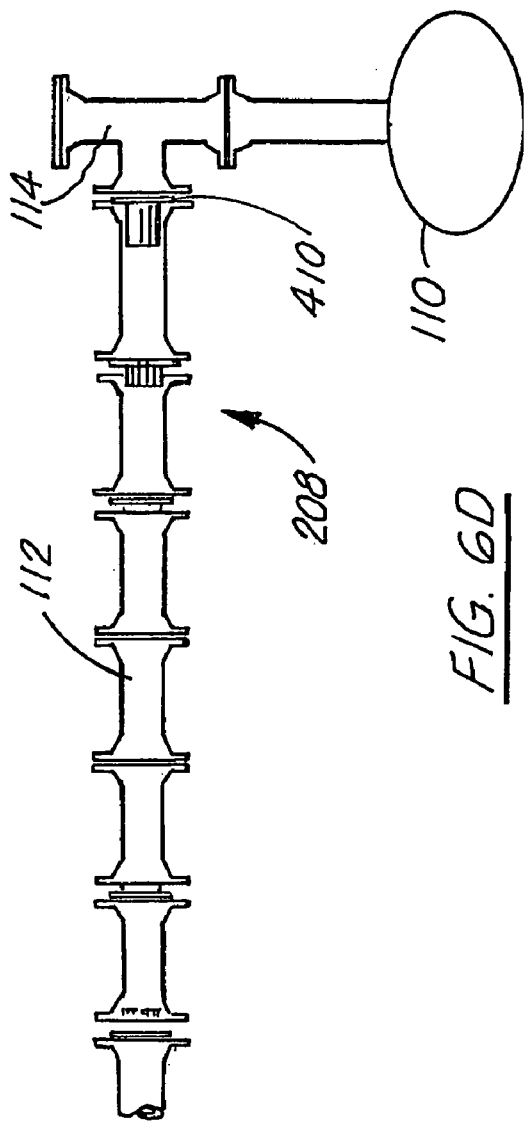
Figure 6E:
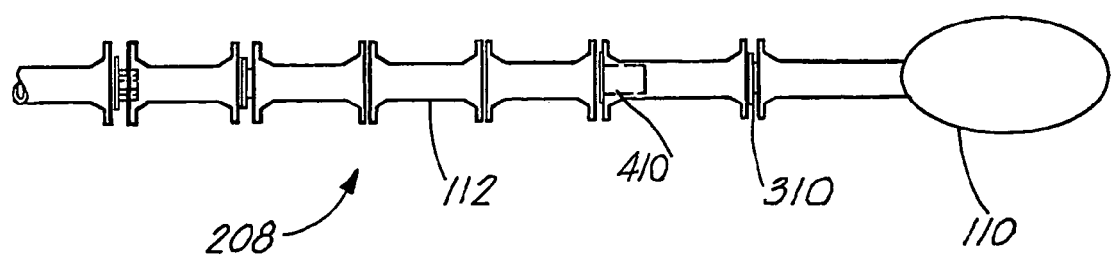
Figure 6F:
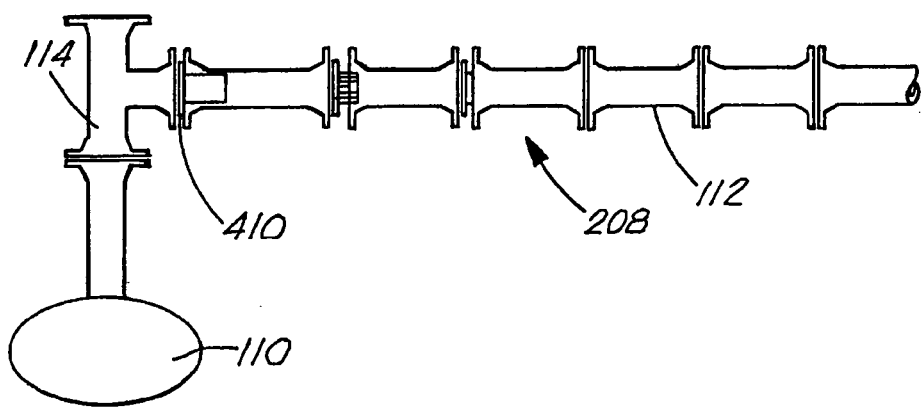

FIGS. 6a through 6f illustrate alternative deployments for an ultrasonic acoustic noise filter(s) according to the invention. In these embodiments, note that the SAFE product is provided in accordance with the invention as illustrated through FIG. 4, and the destroyer product is provided in accordance with the illustrations of FIG. 3. Referring to FIGS. 6c and 6f, in one arrangement, the SAFE noise filter (e.g., 410) is shown disposed in a flow stream defined between a meter and a noise source. As described previously, the noise filter 410 is capable of attenuating ultrasonic noise, particularly indirect noise, up to 45 dB. In these Figures, a blind tee is utilized in combination with the noise filter 410, to deflect ultrasonic noise so as to generate indirect ultrasonic noise. In particular, the blind tee eliminates the direct acoustic line of sight relation between the noise source and the meter, thereby deflecting a portion of the direct noise (while also attenuating up to 8 dB).

In yet another aspect of the invention, a fluid flow system arrangement, as shown in FIG. 6e, is provided in which the meter and the noise source are in serial relation within a fluid flow stream. In particular, the meter and noise source are disposed in fluid communication with each other and in a substantially straight piping run between them. In other words, the meter and the noise source, absent some obstruction in the fluid flow stream, are positioned so as to be in direct acoustic line of sight relation. In accordance with the invention, such an arrangement between the meter and a noise source is made possible through use of an ultrasonic noise filter 410. As discussed previously, incorporation of the noise filter 410 in the fluid flow system of FIG. 6e (without noise filter 310) effectively attenuates the noise up to about 20 to 30 dB of substantially direct noise without a significant direct noise component). Again, as discussed previously, the deployment of the noise filter 410 effectively attenuates much of the significant portion of the indirect noise generated by the noise source, and also through reflection (e.g., by presenting non-porous or flow restrictive surfaces provided primarily on the upstream webbing plate).

Preferably, a fluid flow system arrangement as shown in FIG. 6e will also include a second noise filter 310. Particularly, the second noise filter 310 is used to eliminate the line of sight relation between the meter and the noise source. In this manner, as discussed previously, the noise filter 310 effectively deflects direct ultrasonic noise, thereby attenuating ultrasonic noise by as much as 8 dB. More importantly, the noise filter 310 deflects direct ultrasonic noise so as to convert the direct noise to indirect noise, as it exits downstream of the noise filter 310. This indirect noise can then be absorbed by the absorbent materials of the noise filter 410. In this manner, the combination of the noise filter 310 (primarily a deflector element) and the noise filter 410 (primarily an absorbent element) attenuates the ultrasonic noise up to about 40 dB to 50 dB.

Figure 7A:
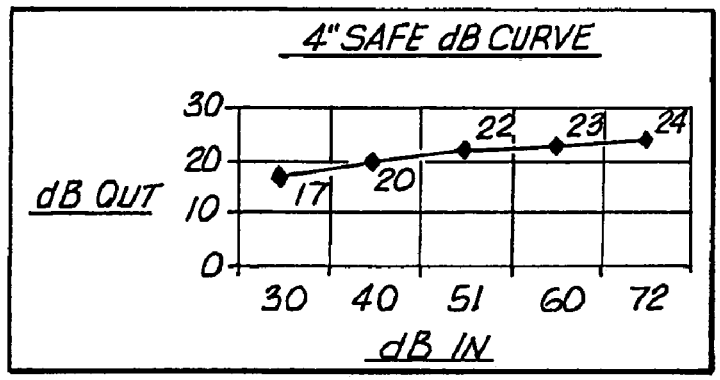
FIGS. 7A–7B are performance results of noise filters for use with the present inventive method.
Figure 7B:
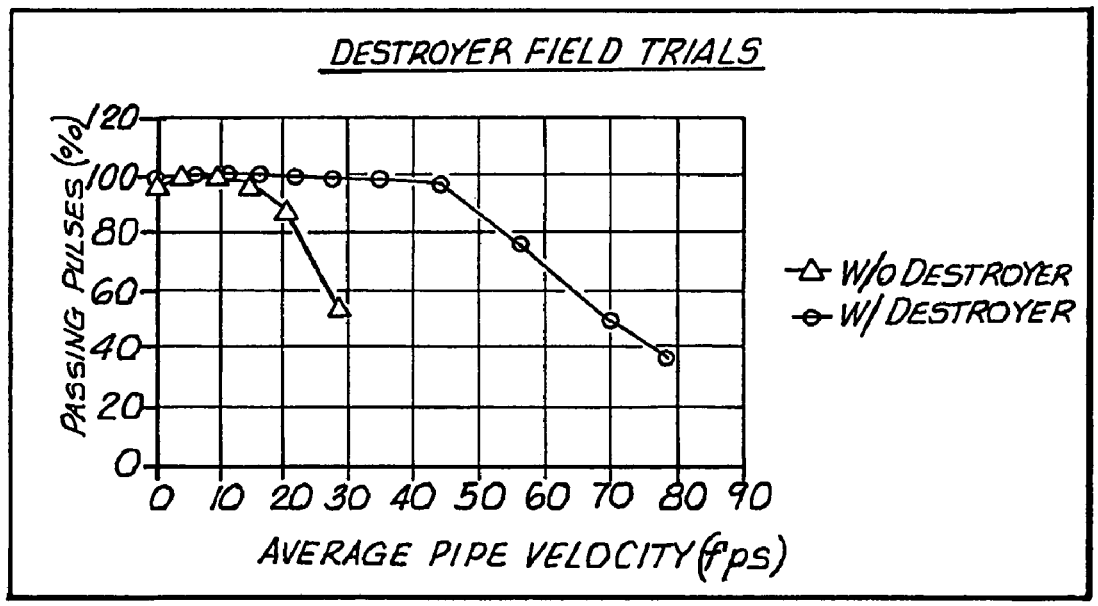

FIGS. 7a and 7b reflect performance results using the noise filters of the present invented method demonstrating its improved performance.

It should be understood, however, that various arrangements and deployments of acoustic noise filtering devices in accordance with the invention may be made and will vary according to the particular environment and applications. However, in any such applications, various aspects of the inventions will be applicable, as described above.

The foregoing description of the present invention has been presented for purposes of illustration description. It is to be noted that the description is not intended to limit invention to the system, apparatus, and method disclosed herein. Various aspects of the invention as described above may be applicable to other types of fluid flow systems and methods for filtering noise, or for attenuating ultrasonic noise. It is be noted also that the invention is embodied in the method described, the system and apparatus utilized in the methods, and in the related components and subsystems. For example, elements of the ultrasonic acoustic noise filter described above, for example the use and configuration of the absorbent material, or the use or configuration of the flow channels to eliminate the line of sight, may be implemented in other fluid flow applications or devices. These variations of the invention will become apparent to one skilled in the acoustics, fluid mechanics, or other relevant art, provided with the present disclosure. Consequently, variations and modifications commensurate with the above teachings and the skill and knowledge of the relevant art are within the scope of the present invention. The embodiments described and illustrated herein are further intended to explain the best modes for practicing the invention, and to enable others skilled in the art to utilize the invention and other embodiments and with various modifications required by the particular applications or uses of the present invention.

What is claimed is:

1. A fluid flow system comprising:
    a fluid flow conduit;
    a noise source disposed in said fluid flow conduit such that ultrasonic noise generated by said noise source propagates in said fluid flow conduit; and
    an ultrasonic noise filter apparatus disposed in said fluid flow conduit, said noise filter apparatus including a first noise filter and a second noise filter;
    wherein said first noise filter includes an absorbent element constructed to attenuate ultrasonic noise propagating from said noise source in the direction of said first and second noise filters; and
    wherein said second noise filter is disposed in said fluid flow conduit between said first noise filter and said noise source and includes a deflector element positioned to deflect ultrasonic noise propagating from said noise source before the noise source passes to said first noise filter.

2. The fluid flow system of claim 1, wherein said deflector element is acoustically positioned in said fluid flow conduit so as to provide the sole direct line of sight acoustic obstruction between said noise source and said first and second noise filters.

3. The fluid flow system of claim 2, wherein said second noise filter includes a plurality of said deflector elements, said deflector element having a configuration defining a flow path with an entrance and an exit, and wherein said entrance and said exit are offset to eliminate direct line of sight therebetween.

4. The fluid flow system of claim 1, wherein said second noise filter includes a plurality of said deflector elements, said deflector elements having a configuration defining a flow path with an entrance and an exit, wherein said entrance and said exit are offset to eliminate direct line of sight therebetween and wherein said deflector elements are positioned such that, in a plurality of deflector elements, each deflector element rotated in one direction is positioned adjacent a deflector element rotated in a counter direction.

5. The fluid flow system of claim 1, further comprising:
    an ultrasonic device operable at ultrasonic frequencies, said ultrasonic device being disposed in said fluid flow conduit such that said first and second noise filters are positioned intermediate said ultrasonic device and said noise source.

6. The fluid flow system of claim 5, wherein said second noise filter is acoustically positioned in said fluid flow conduit so as to provide the sole direct line of sight obstruction between said noise source and said ultrasonic device.

7. The fluid flow system of claim 5, wherein said noise source is a control valve and said ultrasonic device is an ultrasonic meter.

8. The fluid flow system of claim 7, wherein said meter, said noise filter apparatus, and said control valve define a substantially straight flow stream thereacross.

9. The fluid flow system of claim 1, wherein said deflector element is configured to convert directly propagating noise to indirectly propagating noise.

10. The fluid flow system of claim 1, wherein said absorbent element includes an absorbent material configured to convert ultrasonic acoustic motion to vibration, thereby attenuating ultrasonic noise.

11. The fluid flow system of claim 10, wherein said fluid flow conduit defines a fluid flow stream and wherein said absorbent material is disposed in generally parallel relation with said flow stream.

12. The fluid flow system of claim 11, wherein said absorbent material includes suspended, vibratable members of said absorbent material positioned into said flow stream.

13. The fluid flow system of claim 10, wherein said absorbent material is a fibrous material.

14. The fluid flow system of claim 10, wherein said absorbent element includes lateral sections formed by spirally wound layers of said absorbent material.

15. The fluid flow system of claim 14, wherein said fluid flow conduit defines a fluid flow stream and wherein said lateral sections overlap to form protrusions into said flow stream.

16. The fluid flow system of claim 14, wherein said lateral sections include pairs of said spirally wound layers of absorbent material that are adjacent one another and disposed in opposite spiral wound relation.

17. The fluid flow system of claim 10, wherein said absorbent material is polyester.

18. The fluid flow system of claim 1, wherein said first noise filter includes a plurality of channels each defining a flow path, and an absorbent wall surface positioned in generally parallel relation with said flow path and whereon absorbent material of said absorbent element is disposed.

19. The fluid flow system of claim 18, wherein said first noise filter includes a longitudinal centerline and a plurality of outside channels positioned radially equidistant from said longitudinal centerline.

20. The fluid flow system of claim 19, wherein said first noise filter includes an inside channel positioned about said longitudinal centerline, said inside channel having an inside surface whereon said absorbent material is disposed.

21. The fluid flow system of claim 19, wherein said outside channels include an absorbent wall surface whereon said absorbent material is disposed and an oppositely facing exposed surface free of said absorbent material, said absorbent and exposed wall surfaces defining a maximum gap therebetween.

22. The fluid flow system of claim 21, wherein said outside channel includes an entrance, said entrance including a lip positioned acoustically upstream of and adjacent said absorbent wall surface, such that a maximum gap between said lip and said exposed surface is less than said maximum gap between said absorbent wall surface and said exposed wall surface, and wherein said lip is adapted to generate turbulent flow immediately downstream thereof.

* * * * *